April 4, 1961  J. H. JACOBS  2,978,141
COOKING UTENSIL
Filed May 26, 1959
FIG_1
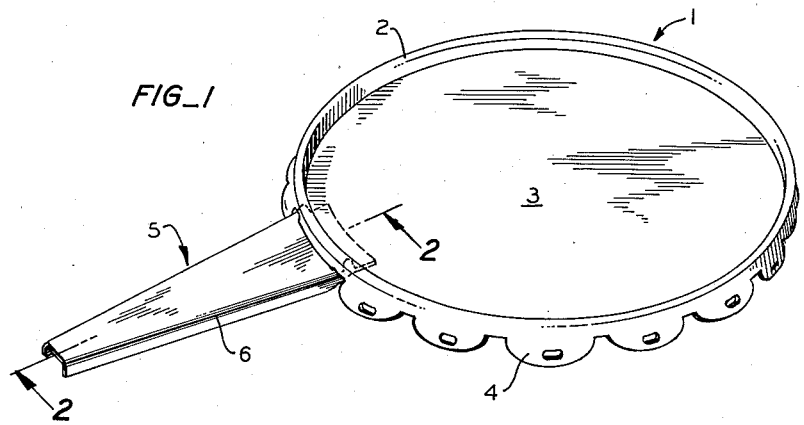
FIG_2
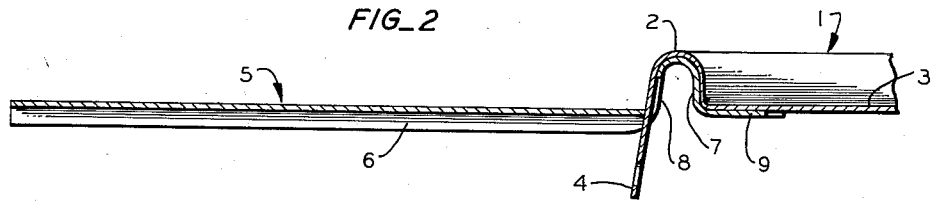
FIG_3
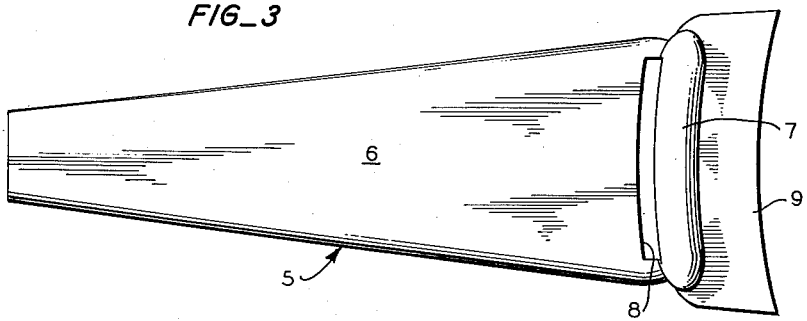
INVENTOR.
JOHN H. JACOBS
BY
*Carl Hoppe*
ATTORNEY

United States Patent Office 2,978,141
Patented Apr. 4, 1961

2,978,141
COOKING UTENSIL

John H. Jacobs, Berkeley, Calif., assignor to Vacu-Dry Company, Oakland, Calif., a corporation of California Filed May 26, 1959, Ser. No. 815,950

2 Claims. (Cl. 220—94)

This application refers generally to cooking utensils and more particularly to an improved mountable pan for emergency use, for camping, or the like.

The principal object of this invention is to provide a light-weight mountable pan for emergency use which is easily assembled and disassembled.

Another object of this invention is to utilize a conventional canister cover as one of the component elements of such a mountable pan.

Further objects and advantages of this invention will be apparent from a reading of the following description in view of the accompanying drawings wherein:

Fig. 1 is a perspective assembly view of a pan embodying features of the present invention;

Fig. 2 is an enlarged cross-sectional view taken along line 2—2 of Fig. 1; and

Fig. 3 is an enlarged top view of the handle.

Referring to the drawings wherein the same numeral has been used in reference to a particular part throughout the various figures, a conventional canister cover or lid, referred to generally as 1, is utilized as the cooking surface of the pan. The cover 1 has a channel-shaped rim 2 raised above the top surface 3 and designed to fit the top periphery of a canister, which it is adapted to close. Within this rim 2 is normally provided a sealing gasket of resilient material such as rubber, cork or the like.

The canister and the gasket are not shown herein because they form no part of the instant invention.

The rim 2 is of the type having a plurality of closure tabs 4 depending therefrom substantially perpendicular to the top surface 3. These tabs 4 are used to seal the cover 1 on a canister by bending the lower extremity of each inwardly around a bead carried on the top of the canister.

The present invention includes in combination with the foregoing canister cover, a handle referred to generally as 5, which has at one end an extended portion 6 to be grasped by the user. A raised ridge 7 arcuately shaped to fit snugly in the channel rim 2 of the canister cover 1, is provided near the other end of the handle. The handle 5 is also provided with a slot 8, arcuately shaped to fit one of the closure tabs 4 of the cover. This slot 8 is formed in the handle 5 directly adjacent to the ridge 7 and it extends up from the plane of the handle partially into the side of the ridge 7. The handle also is provided with a lip 9 extending beyond the ridge 7 to the end of the handle. The lip 9 engages the underside of the cover surface 3 and provides vertical support therefor.

The handle of this invention is easily mounted upon the cover by simple manipulative steps. First, the sealing gasket is removed so that the channel rim can receive the raised ridge 7 of the handle. Then, as indicated in Figs. 1 and 2, one of the closure tabs 4 is inserted downwardly through the slot 8 in the handle. The raised ridge 7 is then fitted snugly into the channel rim 2 with the lip 9 providing vertical suport for the canister top surface 3. A supporting moment for the cover 1 is developed by the combination of the closure tab 4, the slot 8, and the ridge 7 snugly fitting within the channel of the rim 2.

The foregoing detailed description has been given for clearness of understanding only, and no unnecessary limitations should be understood therefrom, for modifications will be obvious to those skilled in the art.

I claim:

1. A cooking utensil comprising a substantially flat member defining a cooking surface, said member being formed peripherally with a raised, channel-shaped rim, and at least one tab means depending from the outer edge of said rim; a handle supporting said member and including a grasping end and a supporting end, a slot formed transversely in said handle proximate said supporting end and removably receiving said depending tab, a raised ridge formed transversely of said handle between said slot and supporting end, said raised ridge engaging and mating wiht a portion of the under surface of said raised rim of said member, said supporting end terminating in a lip projecting forwardly from a point on said ridge substantially co-planar with said grasping end.

2. A handle comprising a grasping end and a supporting end, a transverse slot formed in said handle proximate said supporting end, a transverse raised ridge formed between said slot and said supporting end, and a lip projecting forwardly from a point on said ridge substantially co-planar with said grasping portion.

References Cited in the file of this patent
UNITED STATES PATENTS

| | | |
|---|---|---|
| 603,857 | Perotte | May 10, 1898 |
| 912,472 | Hart | Feb. 16, 1909 |
| 1,746,093 | Thompson | Feb. 4, 1930 |
| 1,848,649 | Oehler | Mar. 8, 1932 |
| 2,589,423 | Nadolsky | Mar. 18, 1952 |